(12) United States Patent
Zhang et al.

(10) Patent No.: US 10,834,396 B2
(45) Date of Patent: Nov. 10, 2020

(54) BILATERAL FILTER FOR PREDICTED VIDEO DATA

(71) Applicant: QUALCOMM Incorporated, San Diego, CA (US)

(72) Inventors: Li Zhang, San Diego, CA (US); Kai Zhang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/381,568

(22) Filed: Apr. 11, 2019

(65) Prior Publication Data
US 2019/0320171 A1    Oct. 17, 2019

Related U.S. Application Data

(60) Provisional application No. 62/656,872, filed on Apr. 12, 2018.

(51) Int. Cl.
*H04N 19/117* (2014.01)
*H04N 19/124* (2014.01)
(Continued)

(52) U.S. Cl.
CPC ......... *H04N 19/117* (2014.11); *H04N 19/124* (2014.11); *H04N 19/176* (2014.11); *H04N 19/53* (2014.11); *H04N 19/91* (2014.11)

(58) Field of Classification Search
CPC .. H04N 19/117; H04N 19/124; H04N 19/176; H04N 19/53; H04N 19/91; H04N 19/80; H04N 19/573; H04N 19/577
See application file for complete search history.

(56) References Cited

U.S. PATENT DOCUMENTS

| | | | |
|---|---|---|---|
| 2012/0195356 A1* | 8/2012 | Yi | H04N 19/119 |
| | | | 375/224 |
| 2013/0003832 A1* | 1/2013 | Li | H04N 19/182 |
| | | | 375/240.12 |

(Continued)

OTHER PUBLICATIONS

Albrecht M., et al., "Description of SDR, HDR and 360° video coding technology proposal by Fraunhofer HHI", 10. JVET Meeting; Oct. 4, 2018-Apr. 20, 2018; San Diego; (The Joint Video Exploration Team of ISO/IEC JTC1/SC29/WG11 and ITU-T SG.16 ), 118 pages, url: http://phenix.int-evry.fr/jvet/, No. JVET-J0014, Apr. 3, 2018 (Apr. 3, 2018), XP030151172, sections 2.1.4.6, 2.1.8.1, 2.1.11.1 and 3.

(Continued)

*Primary Examiner* — Marnie A Matt
(74) *Attorney, Agent, or Firm* — Shumaker & Sieffert, P.A.

(57) ABSTRACT

A device for coding video data includes a memory configured to store video data; and one or more processors comprising circuitry and configured to generate a prediction block for a current block of video data; apply a bilateral filter to the prediction block to generate a filtered prediction block for the current block, wherein to apply the bilateral filter, the processor is configured to determine weighting values to apply to neighboring pixels to a current pixel of the prediction block to be filtered according to values of the neighboring pixels; and code the current block using the filtered prediction block.

30 Claims, 13 Drawing Sheets

(51) Int. Cl.
      H04N 19/176    (2014.01)
      H04N 19/53     (2014.01)
      H04N 19/91     (2014.01)

(56) References Cited

U.S. PATENT DOCUMENTS

| | | | |
|---|---|---|---|
| 2016/0050442 A1* | 2/2016 | Saxena | H04N 19/865 375/240.29 |
| 2018/0184126 A1* | 6/2018 | Zhang | H04N 19/137 |
| 2019/0014349 A1 | 1/2019 | Karczewicz et al. | |
| 2019/0082176 A1 | 3/2019 | Zhang et al. | |

OTHER PUBLICATIONS

Anonymous: "Bilateral filter—Wikipedia", Oct. 29, 2017 (Oct. 29, 2017), XP055605543, 4 Pages, Retrieved from the Internet: URL:https://en.wikipedia.org/w/index.php?title=Bilateral_filter&oldid=807635345 [retrieved on Jul. 15, 2019].

Chen J., et al., JVET-G1001-V1 "Algorithm Description of Joint Exploration Test Model 7 (JEM7)", Joint Video Exploration Team (JVET)of ITU-T SG 16 WP 3 and ISO/IEC JTC 1/SC 291WG 11, 7th Meeting, Jul. 13, 2017-Jul 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 23.5—p. 18, section 2.

He J., et al., "Reducing SVC coding complexity by disabling chroma deblocking filter", 21. JVT Meeting; 78. MPEG Meeting; Oct. 20, 2006-Oct. 27, 2006; Hangzhou,CN; (Joint Video Team of ISO/IEC JTC1/SC29/WG11 and ITU-T SG.16 ), No. JVT-U020, Oct. 16, 2006 (Oct. 16, 2006), XP030006666, 10 Pages, abstract, section "Introduction".

International Search Report and Written Opinion—PCT/US2019/027289—ISA/EPO—dated Jul. 23, 2019, 17 pp.

Pfaff J., et al., "Signal Adaptive Diffusion Filters for Video Coding", 10. JVET Meeting; Apr. 10, 2018-Apr. 20, 2018; San Diego; (The Joint Video Exploration Team of ISO/IEC JTC1/SC29/WG11 and ITU-T SG. 16 ); URL: http://phenix.int-evry.fr/JVET/, No. JVET-J0038, Apr. 3, 2018 (Apr. 3, 2018), XP030151211, 10 Pages, abstract, sections 1-2, tables 1-4.

Strom J., et al., "Bilateral Filter After Inverse Transform," Joint Video Exploration Team (JVET) of ITU-T SG 16 and ISO/IEC JTC 1/SC 29/WG 11, Document: JVET-D0069, 4th Meeting: Chengdu, CN, Oct. 15-21, 2016, 5 pages, Oct. 6, 2016 (Oct. 6, 2016), XP030150302, URL: http://phenix.int-evry.fr/JVET, abstract, sections 1-2, figure 1.

Strom J., et al., "Bilateral Filter Strength Based on Prediction Mode", 5. JVET Meeting; Dec. 1, 2017-Dec. 20, 2017; Geneva; (The Joint Video Exploration Team of ISO/IECJTC1/SC29/WG11 and ITU-T SG.16); No. JVET-E0032, Jan. 3, 2017 (Jan. 3, 2017), XP030150498, pp. 1-3, URL: http://phenix.int-evry.fr/jvet/ , abstract sections 1-2.

Strom J., et al., "EE2-JVET related: Division-free bilateral filter," Joint Video Exploration Team (JVET) of ITU-T SG 16 and ISO/IEC JTC 1/SC 29/WG 11, 6th JVET Meeting: Hobart, AU, Mar. 31-Apr. 7, 2017, JVET-F0096, pp. 1-7, Apr. 2, 2017 (Apr. 2, 2017), XP030150774, URL: http://phenix.int-evry.fr/JVET/.

Strom J., et al., "EE2-JVET-E0032 Bilateral filter Test 1, Test2", 6. JVET Meeting; Mar. 31, 2017-Apr. 7, 2017; Hobart; (The Joint Video Exploration Team of ISO/IEC JTC1/SC29/WG11 and ITU-T SG. 16 ); URL: http://phenix.int-evry.fr/JVET/, No. JVET-F0034, Mar. 23, 2017 (Mar. 23, 2017), XP030150687, 7 Pages, section 2.

Winken M., et al., "Multi-Hypothesis Inter Prediction", 10. JVET Meeting; Apr. 10, 2018-Apr. 20, 2018; San Diego; (The Joint Video Exploration Team of ISO/IEC JTC1/SC29/WG11 and ITU-T SG. 16 ); URL: http://phenix.int-evry.fr/JVET/, No. JVET-J0041, Apr. 3, 2018 (Apr. 3, 2018), XP030151214, 8 Pages, abstract, sections 1-3.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

Ergen S., "ZigBee/IEEE 802.15.4 Summary", Sep. 10, 2004, 37 pp.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

Karczewicz M., et al., "Improvements on Adaptive Loop Filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://phenix.int-evry.fr/JVET/, No. JVET-B0060, 6 pages.

Karczewicz M., et al., "EE2.5: Improvements on Adaptive Loop Filter," Joint Video Exploration Team (JVET) of ITU-T SG 16 WP 3 and ISO/IEC JTC 1/SC 29/WG 11, Document: JVET-00038, 3rd Meeting: Geneva, CH, May 26-Jun. 1, 2016, 4 pages.

Chen J., et al., "Algorithm description of Joint Exploration Test Model 3", 3rd JVET Meeting; May 26, 2016-Jan. 6, 2016; Geneva; (The Joint Video Exploration Team of ISO/IEC JTC1/SC29/WG11 and ITU-T SG.16); URL: http://phenix.int-evry.fr/jvet/, No. JVET-C1001_v1, Jul. 2, 2016 (Jul. 2, 2016), XP030150223, 38 Pages.

Tomasi C., et al., "Bilateral Filtering for Gray and Color Images," in Proceedings of the IEEE International Conference on Computer Vision, 1998, pp. 839-846. (Applicant points out, in accordance with MPEP 609.04(a), that the year of publication, 1998, is sufficiently earlier than the effective U.S. filing date, so that the particular month of publication is not in issue.).

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.

Fu C-M., et al., "Sample Adaptive Offset in the HEVC Standard", IEEE Transactions on Circuits and Systems for Video Technology, Institute of Electrical and Electronics Engineers, USA, Dec. 1, 2012, vol. 22, No. 12, pp. 1755-1764, XP011487153, ISSN: 1051-8215, DOI:10.1109/TCSVT.2012.2221529.

Norkin A., et al., "HEVC Deblocking Filter", IEEE Transactions on Circuits and Systems for Video Technology, Dec. 1, 2012 (Dec. 1, 2012), vol. 22, No. 12, pp. 1746-1754, XP011487156.

Sullivan G.J., et al., "Overview of the High Efficiency Video Coding (HEVC) Standard", IEEE Transactions on circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10.1109/TCSVT.2012.2221191.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

ITU-T H.265, "Series H: Audiovisual and Multimedia Systems, Infrastructure of audiovisual services—Coding of moving video, High efficiency video coding," The International Telecommunication Union. Dec. 2016, 664 pp.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

\* cited by examiner

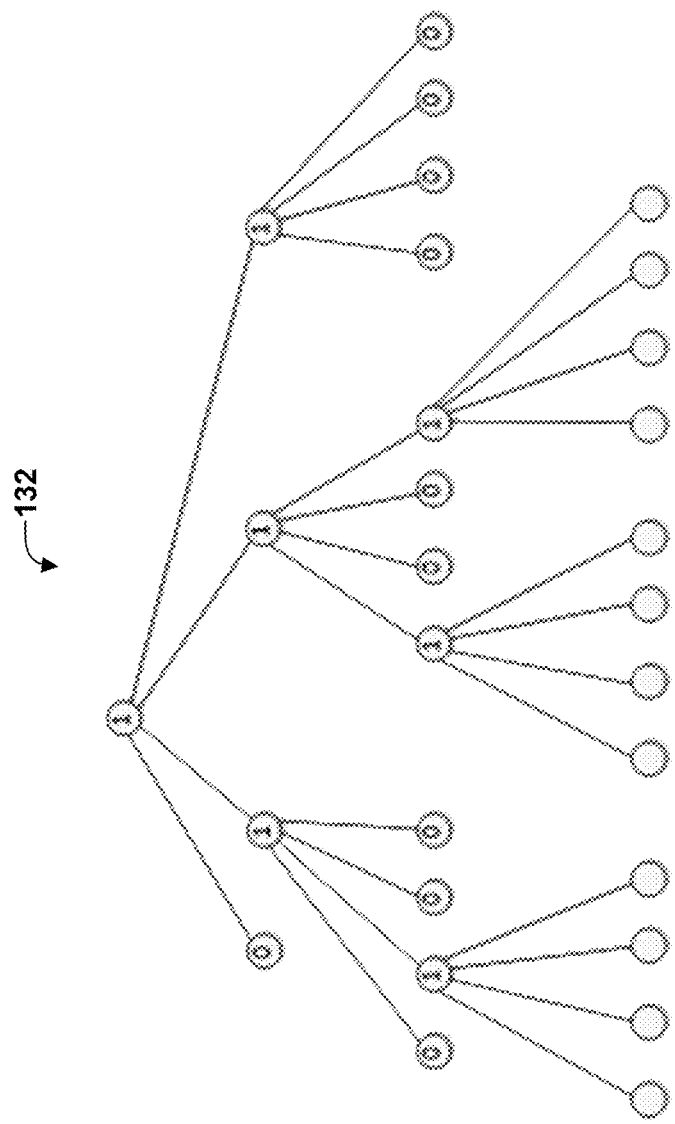
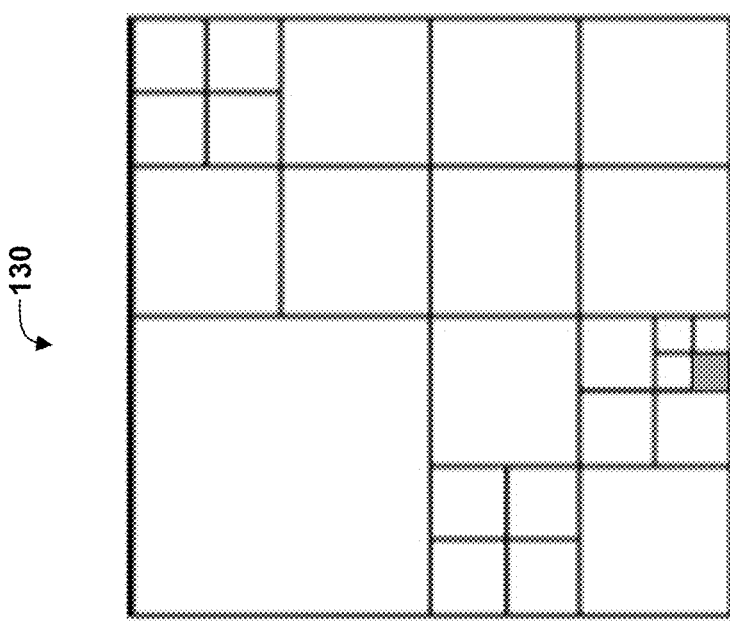
FIG. 2A
FIG. 2B

BILATERAL FILTER FOR PREDICTED VIDEO DATA

This application claims the benefit of U.S. Provisional Application No. 62/656,872, filed Apr. 12, 2018, the entire contents of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for bilateral filtering that may be used during a prediction stage of video coding (encoding or decoding). These techniques may be applied by any existing video codec, such as codecs according to ITU-T H.265/High Efficiency Video Coding (HEVC), or may be applied by future video codecs. These techniques may offer efficient coding tools in future video coding standards.

In one example, a method of coding video data includes generating a prediction block for a current block of video data; applying a bilateral filter to the prediction block to generate a filtered prediction block for the current block, wherein applying the bilateral filter comprises determining weighting values to apply to neighboring pixels to a current pixel of the prediction block to be filtered according to values of the neighboring pixels; and coding the current block using the filtered prediction block.

In another example, a device for coding video data includes a memory configured to store video data; and one or more processors comprising circuitry and configured to generate a prediction block for a current block of video data; apply a bilateral filter to the prediction block to generate a filtered prediction block for the current block, wherein to apply the bilateral filter, the processor is configured to determine weighting values to apply to neighboring pixels to a current pixel of the prediction block to be filtered according to values of the neighboring pixels; and code the current block using the filtered prediction block.

In another example, a device for coding video data includes means for generating a prediction block for a current block of video data; means for applying a bilateral filter to the prediction block to generate a filtered prediction block for the current block, wherein the means for applying the bilateral filter comprises means for determining weighting values to apply to neighboring pixels to a current pixel of the prediction block to be filtered according to values of the neighboring pixels; and means for coding the current block using the filtered prediction block.

In another example, a computer-readable storage medium has stored thereon instructions that, when executed, cause one or more processors to generate a prediction block for a current block of video data; apply a bilateral filter to the prediction block to generate a filtered prediction block for the current block, wherein the instructions that cause the processor to apply the bilateral filter comprise instructions that cause the processor to determine weighting values to apply to neighboring pixels to a current pixel of the prediction block to be filtered according to values of the neighboring pixels; and code the current block using the filtered prediction block.

The details of one or more examples are set forth in the accompanying drawings and the description below. Other features, objects, and advantages will be apparent from the description, drawings, and claims.

BRIEF DESCRIPTION OF DRAWINGS

FIGS. 2A and 2B are conceptual diagrams illustrating an example coding tree unit (CTU) and a corresponding quadtree data structure.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC) or ITU-T H.265, including its range extension, multiview extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). An HEVC draft specification, referred to as "HEVC WD" hereinafter, is described in Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, 14$^{th}$ Meeting: Vienna, AT, 25 Jul. to 2 Aug. 2013, Document JCTVC-N1003 v1, available at phenix.int-evry.fr/jct/doc_end_user/documents/14_Vienna/wg11/JCTVC-N1003-v1. zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. A version of reference software, i.e., Joint Exploration Model 7 (JEM 7) is available at jvet.hhi.fraunhofer.de/svn/svn_HMJEMSoftware/tags/HM-16.6-JEM-7.0/. A description of Joint Exploration Test Model 7 (JEM7) is provided in Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7$^{th}$ Meeting: Torino, IT, 13-21 Jul. 2017, Document JVET-G1001-v1, available at phenix.it-sudparis.eu/jvet/doc_end_user/current_document.php?id=3286.

Figure 1:
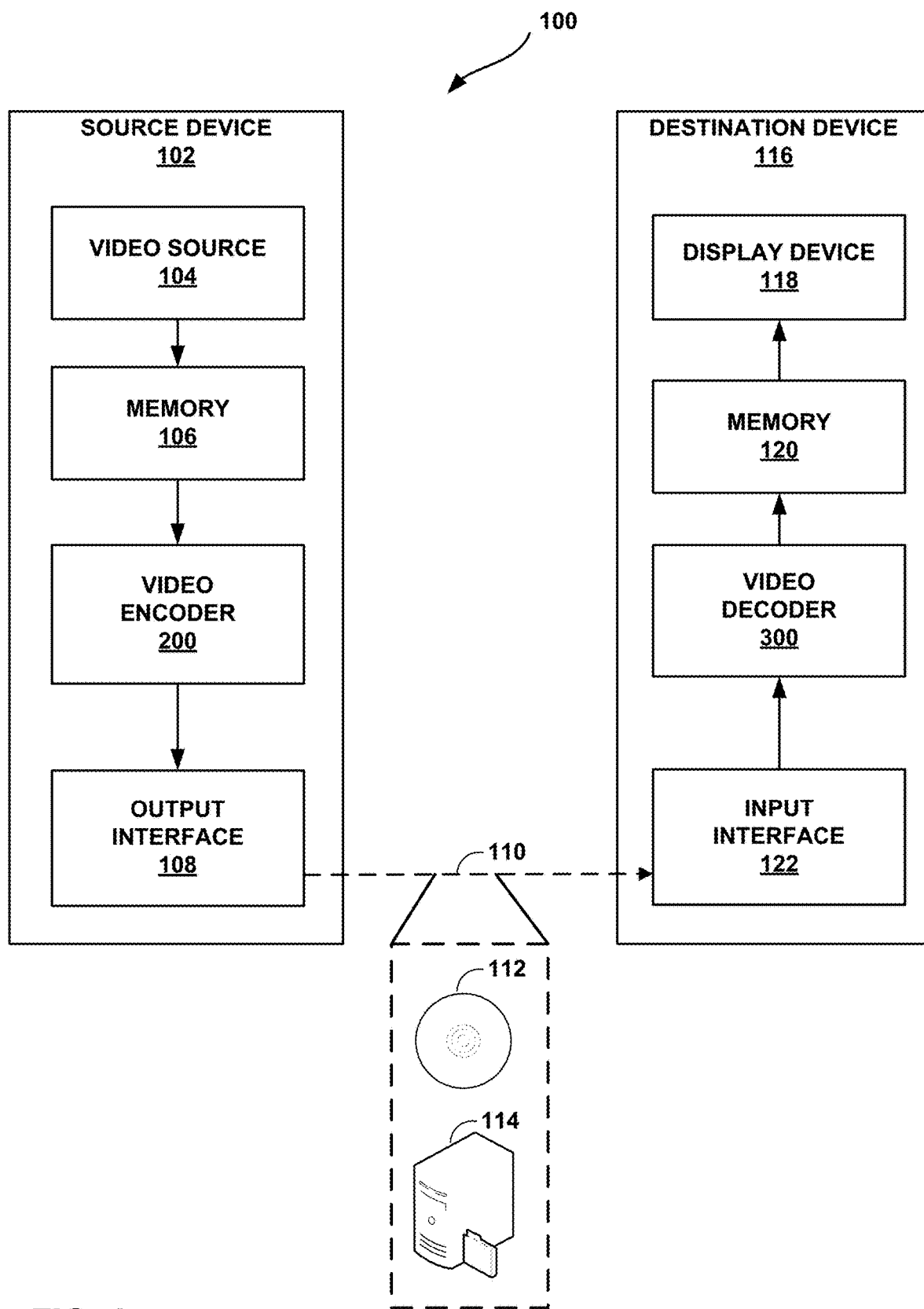
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for bilateral filtering of prediction blocks. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for bilateral filtering of prediction blocks. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

In accordance with the techniques of this disclosure, as discussed in greater detail below, video encoder 200 and video decoder 300 may apply a bilateral filter to a prediction block. That is, video encoder 200 and video decoder 300 may apply the bilateral filter to each pixel (or sample) of the prediction block. The bilateral filter may indicate a set of neighboring pixels to the current pixel of the prediction block to which to apply weighting values. The neighboring pixels may include one or more horizontally neighboring pixels and/or one or more vertically neighboring pixels, e.g., as shown in and discussed with respect to FIGS. 4-8 below. Moreover, video encoder 200 and video decoder 300 may determine the weighting values based on the values of the neighboring pixels themselves. Video encoder 200 and video decoder 300 may thus determine the weighting values and apply the weighting values to the neighboring pixel values to filter the current pixel, thereby updating the value of the current pixel.

Following prediction, such as intra-prediction or inter-prediction of a block, and filtering of the resulting prediction blocks, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

FIGS. 2A and 2B are conceptual diagrams illustrating an example coding tree unit (CTU) 130 and a corresponding quadtree data structure 132. HEVC defines various blocks, including coding units (CUs), prediction units (PUs), and transform units (TUs). In HEVC, the largest coding unit in a slice is called a coding tree block (CTB) or coding tree unit (CTU). A CTB contains a quad-tree, the nodes of which are coding units. According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

In HEVC, blocks specified as luma and chroma CTBs can be directly used as CBs or can be further partitioned into multiple CBs. Partitioning is achieved using tree structures. The tree partitioning in HEVC is generally applied simultaneously to both luma and chroma, although exceptions apply when certain minimum sizes are reached for chroma.

The CTU of HEVC contains a quadtree syntax that allows for splitting the CBs to a selected appropriate size based on the signal characteristics of the region that is covered by the CTB. The quadtree splitting process can be iterated until the size for a luma CB reaches a minimum allowed luma CB size that is selected by the encoder using syntax in the SPS and, per HEVC, is always 8×8 or larger (in units of luma samples).

The boundaries of the picture are defined, in HEVC, in units of the minimum allowed luma CB size. As a result, at the right and bottom edges of the picture, some CTUs may cover regions that are partly outside the boundaries of the picture. This condition is detected by the decoder (e.g., video decoder 300), and the CTU quadtree is implicitly split as necessary to reduce the CB size to the point where the entire CB will fit into the picture.

Figure 3:
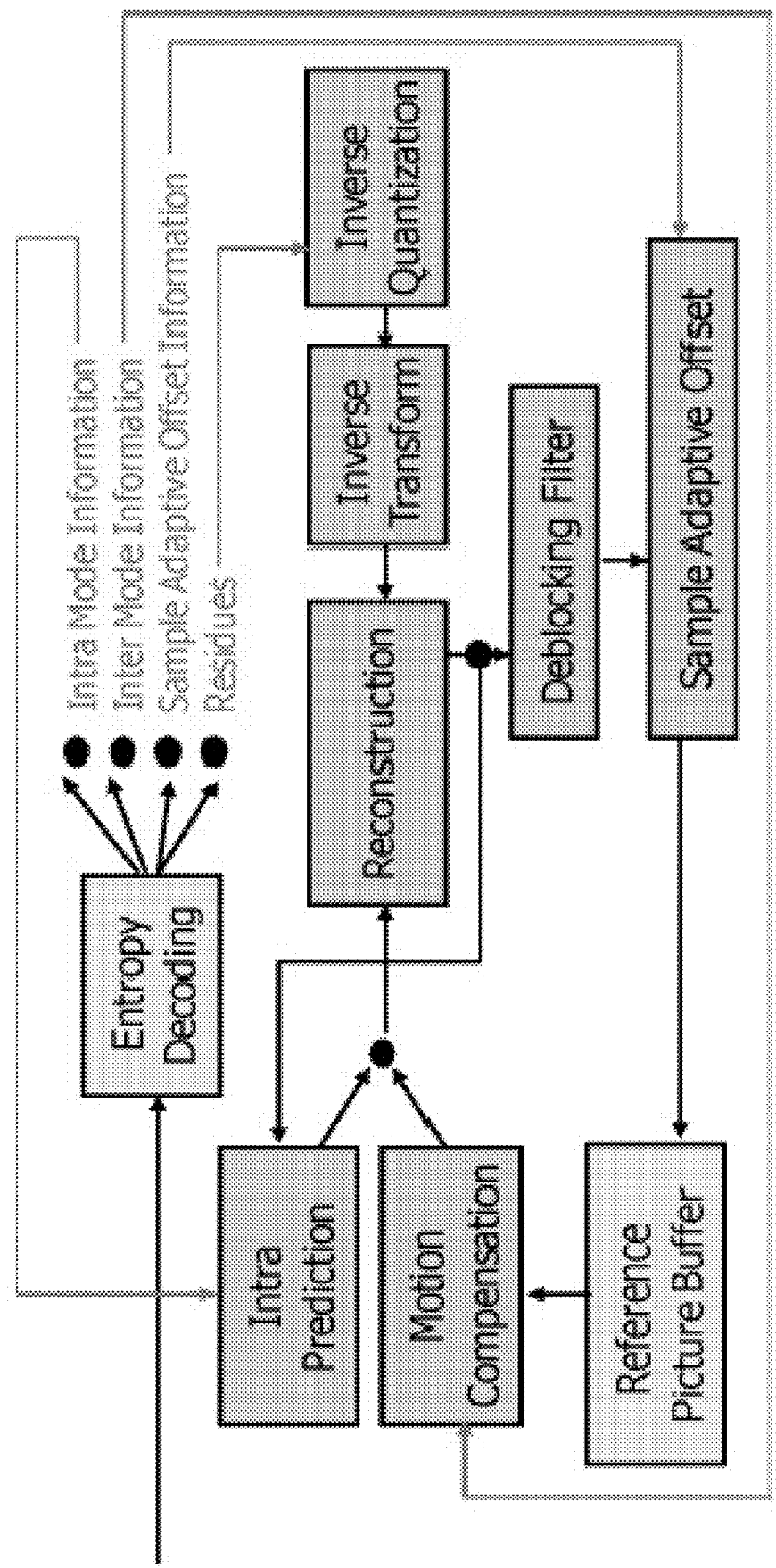
FIG. 3 is a block diagram illustrating an example HEVC decoder.

FIG. 3 is a block diagram illustrating an example HEVC decoder. HEVC employs two in-loop filters, including a de-blocking filter (DBF) and a sample adaptive offset (SAO) filter, as shown in FIG. 3. The video decoder of FIG. 3 may correspond to video decoder 300 (FIG. 1).

The DBF receives input including a reconstructed image after intra or inter prediction. The deblocking filter performs detection of the artifacts at the coded block boundaries and attenuates them by applying a selected filter. Compared to the H.264/AVC deblocking filter, the HEVC deblocking filter has lower computational complexity and better parallel processing capabilities, while still achieving significant reduction of the visual artifacts.

The SAO filter receives the reconstructed image after invoking deblocking filtering. The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC, the region (the unit for SAO parameters signaling) is defined to be a coding tree unit (CTU). Two SAO types that can satisfy the requirements of low complexity are adopted in HEVC: edge offset (EO) and band offset (BO). An index of SAO type may be coded (which may be in the range of [0, 2]).

Figure 4D:
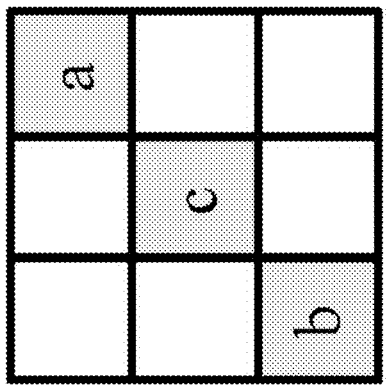
FIGS. 4A-4D are conceptual diagrams illustrating respective directional patterns for edge offset (EO) sample classification.
Figure 4C:
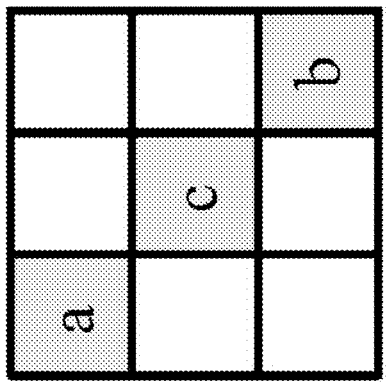
Figure 4B:
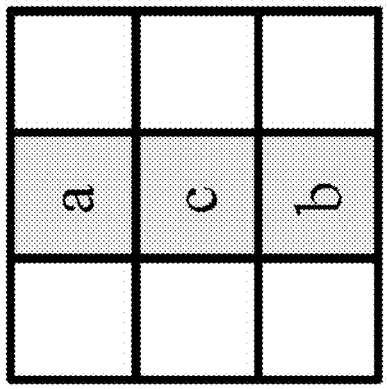
Figure 4A:
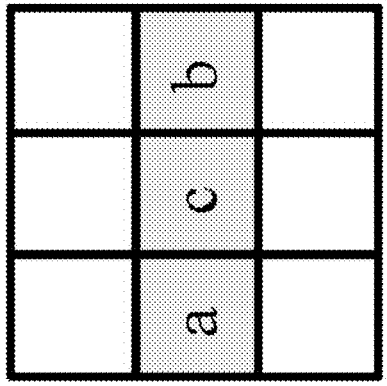

FIGS. 4A-4D are conceptual diagrams illustrating respective directional patterns for edge offset (EO) sample classification. FIG. 4A depicts horizontal (EO class=0), FIG. 4B depicts vertical (EO class=1), FIG. 4C depicts 135 degree diagonal (EO class=2), and FIG. 4D depicts 45 degree diagonal (EO class=3).

For EO, the sample classification is based on a comparison between current samples and neighboring samples according to 1-D directional patterns: horizontal, vertical, 135° diagonal, and 45° diagonal. According to the selected EO pattern, five categories denoted by edgeIdx in Table I are further defined. For edgeIdx equal to 0-3, the magnitude of an offset may be signaled while the sign flag is implicitly coded, i.e., negative offset for edgeIdx equal to 0 or 1 and positive offset for edgeIdx equal to 2 or 3. For edgeIdx equal to 4, the offset is always set to 0 which means no operation is required for this case.

TABLE I

| Category (edgeIdx) | Condition |
|---|---|
| 0 | c < a && c < b |
| 1 | (c < a && c == b) \|\| (c == a && c < b) |
| 2 | (c > a && c == b) \|\| (c == a && c > b) |
| 3 | c > a && c > b |
| 4 | None of the above |

For BO, the sample classification is based on sample values. Each color component may have its own SAO parameters. BO implies one offset is added to all samples of the same band. The sample value range is equally divided into 32 bands. For 8-bit samples ranging from 0 to 255, the width of a band is 8, and sample values from 8k to 8k+7 belong to band k, where k ranges from 0 to 31. The average difference between the original samples and reconstructed samples in a band (i.e., offset of a band) is signaled to the decoder. There is no constraint on offset signs. Only offsets of four consecutive bands and the starting band position are signaled to the decoder.

To reduce side information, multiple CTUs can be merged together (either copying the parameters from an above CTU (through setting sao_merge_left_flag equal to 1) or left CTU (through setting sao_merge_up_flag equal to 1) to share SAO parameters.

In addition to the modified DB and HEVC SAO methods, JEM includes another filtering method, called Geometry transformation-based Adaptive Loop Filtering (GALF). GALF aims improve the coding efficiency of ALF studied in HEVC stage by introducing several new aspects. ALF is aiming to minimize the mean square error between original samples and decoded samples by using Wiener-based adaptive filter. Samples in a picture are classified into multiple categories and the samples in each category are then filtered with their associated adaptive filter. The filter coefficients may be signaled or inherited to optimize the tradeoff between the mean square error and the overhead. In this paper, a Geometry transformation-based ALF (GALF)

scheme is proposed to further improve the performance of ALF, which introduces geometric transformations, such as rotation, diagonal and vertical flip, to be applied to the samples in filter support region depending on the orientation of the gradient of the reconstructed samples before ALF. Input to ALF/GALF may be the reconstructed image after invoking SAO.

In M. Karczewicz, L. Zhang, W.-J. Chien, X. Li, "EE2.5: Improvements on adaptive loop filter", Exploration Team (JVET) of ITU-T SG 16 WP 3 and ISO/IEC JTC 1/SC 29/WG 11, Doc. JVET-B0060, 2nd Meeting: San Diego, USA, 20 Feb.-26 Feb. 2016 and M. Karczewicz, L. Zhang, W.-J. Chien, X. Li, "EE2.5: Improvements on adaptive loop filter", Exploration Team (JVET) of ITU-T SG 16 WP 3 and ISO/IEC JTC 1/SC 29/WG 11, Doc. JVET-O0038, 3$^{rd}$ Meeting: Geneva, CH, 26 May-1 Jun. 2016, the Geometric transformations-based ALF (GALF) is proposed, and has been adopted to the most recent version of JEM, i.e., JEM3.0. In GALF, the classification is modified with the diagonal gradients taken into consideration and geometric transformations could be applied to filter coefficients. Each 2×2 block is categorized into one out of 25 classes based on its directionality and quantized value of activity. The details are described below.

Bilateral filtering was formerly proposed in C. Tomasi and R. Manduchi, "Bilateral filtering for gray and color images", in Proc. of IEEE ICCV, Bombay, India, January 1998, to avoid undesirable over-smoothing for pixels in the edge. The main idea of bilateral filtering is the weighting of neighboring samples takes the pixel values themselves into account to weight more those pixels with similar luminance or chrominance values. A sample located at (i, j), will be filtered using its neighboring sample (k, l). The weight ω(i,j,k,l) is the weight assigned for sample (k, l) to filter the sample (i, j), and it is defined as:

$$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)} \quad (1)$$

where I(i, j) and I(k, l) are the intensity value of samples (i, j) and (k,l) respectively. $\sigma_d$ is the spatial parameter, and $\sigma_r$ is the range parameter. The filtering process with the filtered sample value denoted by $I_D(i,j)$ could be defined as:

$$I_D(i, j) = \frac{\sum_{k,l} I(k, l) * \omega(i, j, k, l)}{\sum_{k,l} \omega(i, j, k, l)} \quad (2)$$

The properties (or strength) of the bilateral filter are controlled by these two parameters. Samples located closer to the sample to be filtered, and samples having smaller intensity difference to the sample to be filtered, will have larger weights than samples further away and with larger intensity differences.

In Jacob Ström, Per Wennersten, Ying Wang, Kenneth Andersson, Jonatan Samuelsson, "Bilateral filter after inverse transform," JVET-D0069, 4th Meeting: Chengdu, CN, 15-21 Oct. 2016, each reconstructed sample in the transform unit (TU) is filtered using its direct neighboring reconstructed samples only. The filter has a plus sign shaped filter aperture centered at the sample to be filtered, as depicted in FIG. 4. σ_d to be set based on the transform unit size (3), and σ_r to be set based on the QP used for the current block (4).

$$\sigma_d = 0.92 - \frac{\min(16, \min(TU \text{ block width}, TU \text{ block height}))}{40} \quad (3)$$

$$\sigma_r = \max\left(\frac{(QP-17)}{2}, 0.01\right) \quad (4)$$

Figure 5:
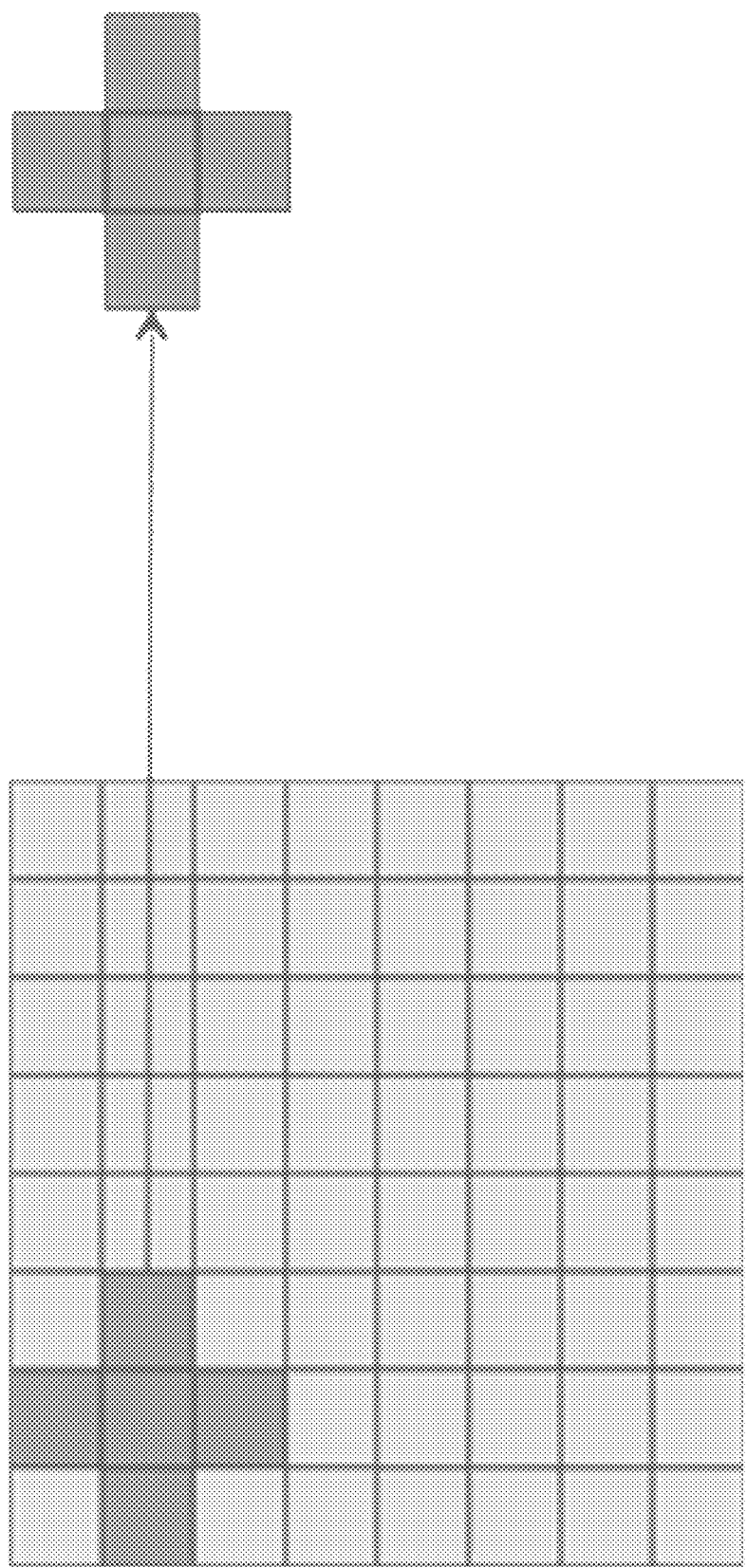
FIG. 5 is a conceptual diagram illustrating an example sample and its neighboring four samples utilized in a bilateral filtering process.

FIG. 5 is a conceptual diagram illustrating a sample and its neighboring four samples utilized in a bilateral filtering process. In J. Ström, P. Wennersten, K. Andersson, J. Enhorn, "Bilateral filter strength based on prediction mode", JVET-E0032, 5th Meeting: Geneva, CH, 12-20 Jan. 2017, to further reduce the coding loss under low delay configuration, the filter strength is further designed to be dependent on the coded mode. For intra-coded blocks, the above equation (3) is still used. While for inter-coded blocks, the following equation is applied:

$$\sigma_d = 0.72 - \frac{\min(8, \min(TU \text{ block width}, TU \text{ block height}))}{40} \quad (5)$$

The different values for $\sigma_d$ means that filter strength for inter prediction blocks is relatively weaker compared to that of intra prediction blocks. Inter prediction blocks typically have less residual than intra prediction blocks. Therefore, the bilateral filter is designed to filter the reconstruction of inter prediction blocks less. The output filtered sample value $I_D(i,j)$ is calculated as:

$$I_F(i, j) = \frac{\sum_{k,l} I(k, l) * \omega(i, j, k, l)}{\sum_{k,l} \omega(i, j, k, l)} \quad (6)$$

Due to the fact that the filter only touches the sample and its 4-neighbours, this equation can be written as:

$$I_F = \frac{I_C \omega_C + I_L \omega_L + I_R \omega_R + I_A \omega_A + I_B \omega_B}{\omega_C + \omega_L + \omega_R + \omega_A + \omega_B} \quad (7)$$

where $I_C$ is the intensity of the center sample, and $I_L$, $I_R$, $I_A$ and $I_B$ are the intensities for the left, right, above and below samples, respectively. Likewise, $\Omega_C$ is the weight for the center sample, and $\omega_L$, $\omega_R$, $\omega_A$ and $\omega_B$ are the corresponding weights for the neighbouring samples. The filter only uses samples within the block for filtering—weights outside are set to 0.

In order to reduce the number of calculations, the bilateral filter in the JEM has been implemented using a look-up-table (LUT). For every QP, there is a one-dimensional LUT for the values $\omega_L$, $\omega_B$, $\omega_A$ and $\omega_B$ where the value $$\omega_{other} = \text{round}\left(65 * e^{\left(-\frac{1}{2*0.82^2} - \frac{\|I-I_C\|^2}{2\sigma_r^2}\right)}\right) \quad (8)$$

is stored, where $\sigma_r^2$ is calculated from (4) depending upon QP. Since $\sigma_d$=0.92−4/40=0.82 in the LUT, it can be used directly for the intra M×N with minimum(M, N) equal to 4 case with a center weight $\omega_C$ of 65, which represents 1.0. For the other modes (i.e., intra M×N but minimum (M, N) unequal to 4, inter K×L blocks), we use the same LUT, but instead use a center weight of:

$$\omega_C = \text{round}\left(65 * \frac{e^{-\frac{1}{2*0.82^2}}}{e^{-\frac{1}{2*\sigma_d^2}}}\right), \quad (9)$$

where $\sigma_d$ is obtained by (3) or (5). The final filtered value is calculated as:

$$I_F = \text{floor}\left(\frac{I_C\omega_C + I_L\omega_L + I_R\omega_R + I_A\omega_A + I_B\omega_B + ((\omega_C + \omega_L + \omega_R + \omega_A + \omega_B) >> 1)}{\omega_C + \omega_L + \omega_R + \omega_A + \omega_B}\right) \quad (10)$$

where the division used is integer division and the term $(\omega_C+\omega_L+\omega_B+\omega_A+\omega_B)>>1$ is added to get correct rounding.

In the JEM reference software, the division operation in Equation 10 is replaced by LUT, multiplication and shift operations. To reduce the size of the numerator and denominator, Equation 10 is further refined to:

$$I_F = I_C + \frac{\omega_L(I_L - I_C) + \omega_R(I_R - I_C) + \omega_A(I_A - I_C) + \omega_B(I_B - I_C)}{\omega_C + \omega_L + \omega_R + \omega_A + \omega_B} \quad (11)$$

In the JEM reference software, Equation 11 is implemented in a way that the division could be implemented by two look-up tables, and (11) could be rewriten as:

$I_F=I_C\text{sign}(\text{PixelDeltaSum})*((\text{sign}(\text{PixelDeltaSum})*\text{PixelDeltaSum}+o)*\text{LUT}(\text{sumWeights})>>(14+\text{DivShift}(\text{sumWeights})))$ (12)

$\text{PixelDeltaSum}=(\omega_L(I_L-I_C)+\omega_R(I_R-I_C)+\omega_A(I_A-I_C)+\omega_B(I_B-I_C)$ $\text{sumWeights}=\omega_C+\omega_L+\omega_R+\omega_A+\omega_B$ $o=\text{PixelDeltaSum}+\text{sign}(\text{PixelDeltaSum})$ $\text{sign}(x)=x>=0?1:-1;$ The two look-up tables are the look-up table LUT to get an approximated value for each 1/x (x is an positive interger value) after shifting, and a look-up table DivShift to define the additional shift value for input x. J. Ström, P. Wennersten, K. Andersson, J. Enhorn, "EE2-JVET related: Division-free bilateral filter", JVET-F0096, 6th Meeting: Hobart, CH, 31 Mar.-7 Apr. 2017 describes further details of this.

The filter is turned off if QP<18 or if the block is of inter type and the block dimensions are 16×16 or larger. It is noted that the proposed bilateral filtering method is only applied to luma blocks with at least one non-zero coefficients. For chroma blocks and luma blocks with all zero coefficients, the bilateral filtering method is always disabled.

Figure 6:
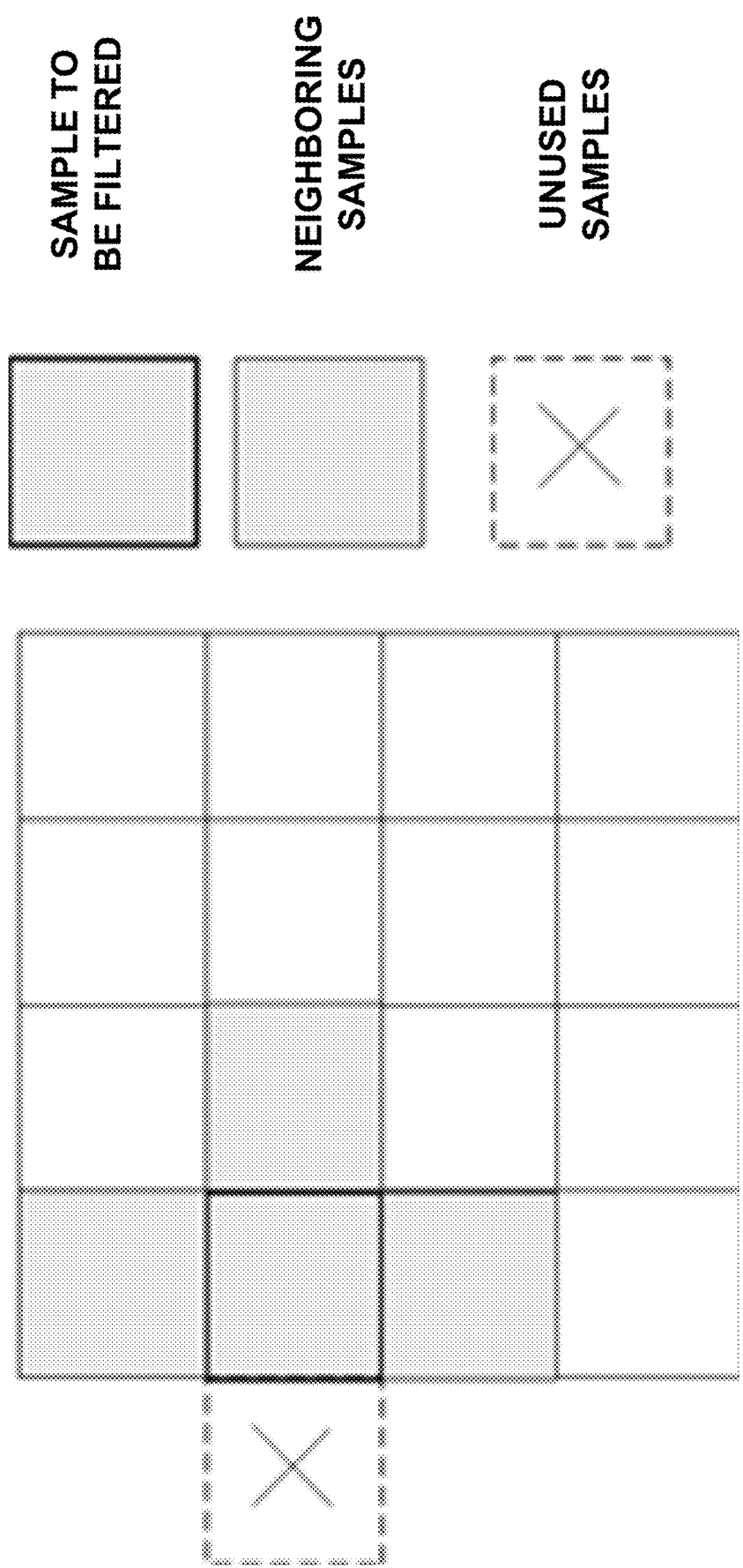
FIG. 6 is a conceptual diagram illustrating an example sample and its neighboring four samples utilized in bilateral filtering process.

FIG. 6 is a conceptual diagram illustrating an example sample and its neighboring four samples utilized in bilateral filtering process. FIG. 6 depicts an example of a current sample at the left boundary (i.e., left column), for which only neighboring samples within current TU are used to filter the current sample. Similar concepts apply to samples at the top of the TU boundary.

U.S. Provisional Application No. 62/528,912, filed Jul. 5, 2017, and U.S. Provisional Application No. 62/556,614, filed Sep. 11, 2017, describe division-free bilateral filtering (DFBil) methods. For one sample to be filtered, the filtering process could be defined as:

$$I_F = I_C + \sum_{i=1}^{N} W(\text{abs}(I_i - I_c)) * (I_i - I_c)$$

where $I_C$ is the intensity of the current sample and $I_F$ is the modified intensity of the current sample after performing DFBil, $I_i$ and $W(\text{abs}(I_i-I_c))$ are the intensity and weighting parameter for the i-th neighboring sample, respectively.

$w_i = Dis_i * Rang_i$ $Rang_i = e^{\left(-\frac{\|I_i - I_c\|^2}{2\sigma_r^2}\right)}$ $Dis_i = \frac{TempD_i}{1 + \sum_{j=1}^{N} TempD_j}$ $TempD_i = e^{\left(-\frac{10^4 * sqrt((i-k)^2 + (j-l)^2)}{2\sigma_d^2}\right)}$ $\sigma_r = (QP - minDFBilQP + 2 * Index_r - 2 * (RCandNum/2)) * 2$ $\sigma_d = DCandidateList[Index_d]$ where minDFBilQP indicates the minimum QP that could apply DFBil, e.g., the minimum QP may be set to 17. Indexd and Indexr may be signaled per quad-tree partition.

Figure 7:
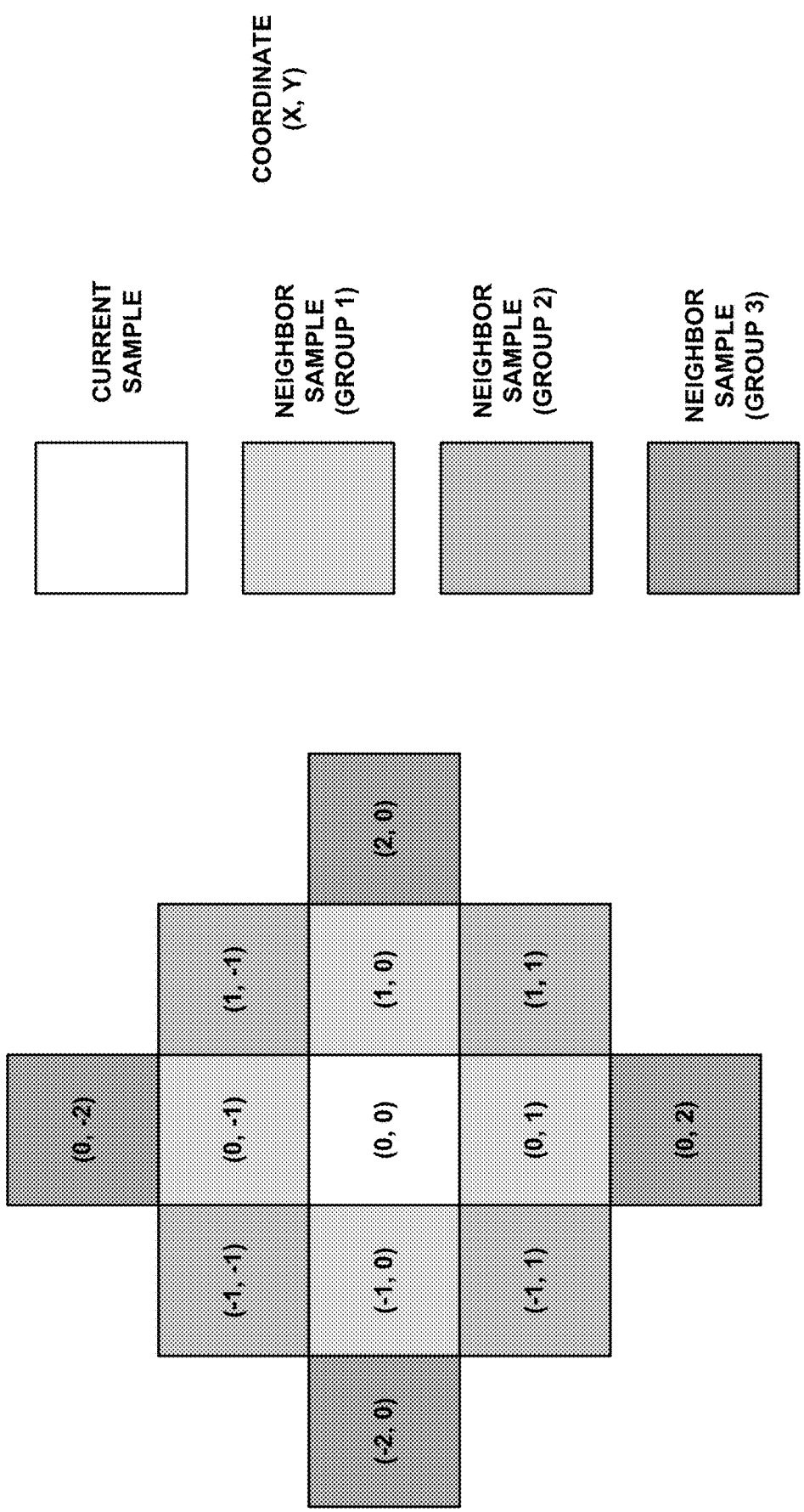
FIG. 7 is a conceptual diagram illustrating an example sample and neighboring samples used in division-free bilateral filtering.

FIG. 7 is a conceptual diagram illustrating an example sample and neighboring samples used in DFBil as discussed above.

This disclosure recognizes that in the design of bilateral filtering, non-division bilateral filter techniques may encounter certain problems. For example, such techniques are applied directly to the reconstructed block or after the whole slice is reconstructed. This mainly helps the spatial neighboring block of the block that was reconstructed if the reconstructed block was coded with intra mode, or for blocks in the following frames. If those filters could be applied to prediction signal (e.g., the prediction block that is used to reconstruct the current block as part of decoding or used to determine a residual block as part of encoding), additional coding gain may be obtained since it may help for reducing the prediction errors.

Figure 9A:
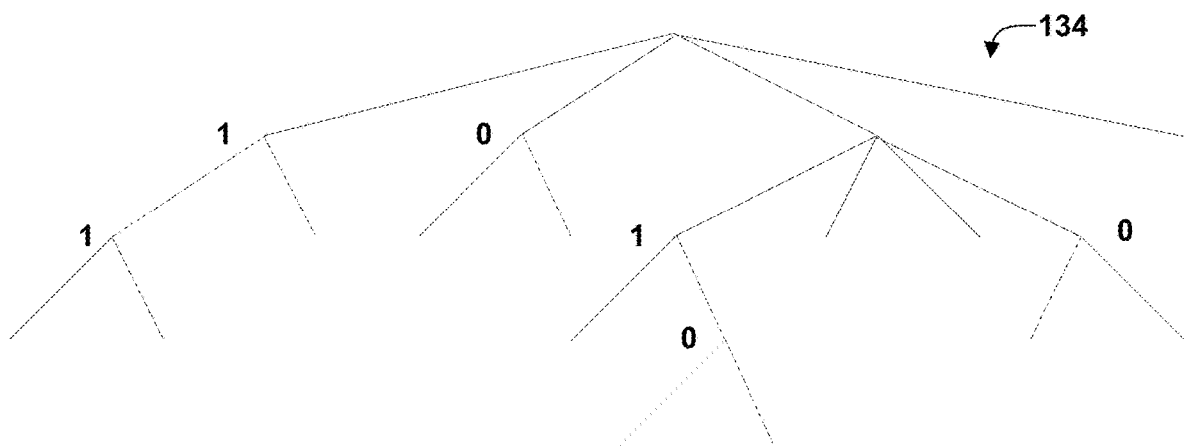
FIGS. 9A and 9B are conceptual diagrams illustrating an example quadtree binary tree (QTBT) structure, and a corresponding coding tree unit (CTU).
Figure 9B:
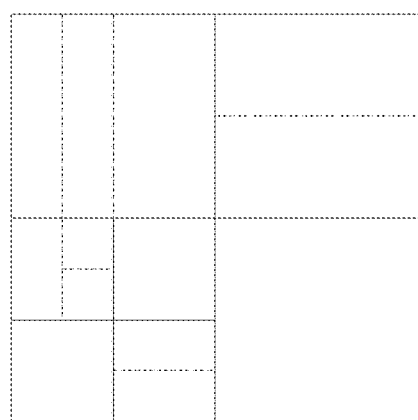

FIGS. 9A and 9B are conceptual diagram illustrating an example quadtree binary tree (QTBT) structure 134, and a corresponding coding tree unit (CTU) 136. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 134 (i.e., the solid lines) and syntax elements (such as splitting information) for a prediction tree level of QTBT structure 134 (i.e., the dashed lines). Video encoder 200 may encode, and video decoder 300 may decode, video data, such as prediction and transform data, for CUs represented by terminal leaf nodes of QTBT structure 134.

In general, CTU 136 of FIG. 9B may be associated with parameters defining sizes of blocks corresponding to nodes of QTBT structure 134 at the first and second levels. These parameters may include a CTU size (representing a size of CTU 136 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 134 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 134 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Referring again to FIG. 1, video encoder 200 and video decoder 300 may be configured to perform any or all of the techniques of this disclosure, in any combination. Such techniques include bilateral filtering techniques. However, these techniques may generally be applied not only to bilateral filters and division-free bilateral filters, but to any other filters that may be applied to a prediction signal.

Video encoder 200 and video decoder 300 may apply a bilateral filter (including a non-local bilateral filter) to a prediction block of a current block. In one example, even for bi-prediction (wherein two temporary prediction blocks may be generated based on motion information for each of the two prediction directions) or multi-hypothesis, a non-local bilateral filter may be applied only once, that is, only applied to the final prediction block. Alternatively, video encoder 200 and/or video decoder 300 may apply a bilateral filter to each of the temporary prediction blocks, regardless of whether the temporary prediction blocks are conventional bi-prediction blocks or blocks coded with multi-hypothesis (e.g., JVET-J0041). Therefore, multiple iterations of bilateral filtering may be applied. Alternatively, for multi-hypothesis coded block (that is, blocks that may be predicted from multiple reference blocks), video encoder 200 and video decoder 300 may apply a bilateral filter only twice, where the prediction blocks may be firstly grouped to generate another temporary block. In one example, which of the prediction blocks may be grouped may depend on the POC distance between the two reference pictures. Video encoder 200 and video decoder 300 may generate prediction blocks with any kind of prediction, such as inter-prediction, intra-prediction, intra-block copy, cross-component linear model prediction (like LM), inter-layer prediction in scalable video coding, inter-view prediction in 3D-video coding, or any combination such as weighted sum of two or more kinds of prediction.

Figure 8:
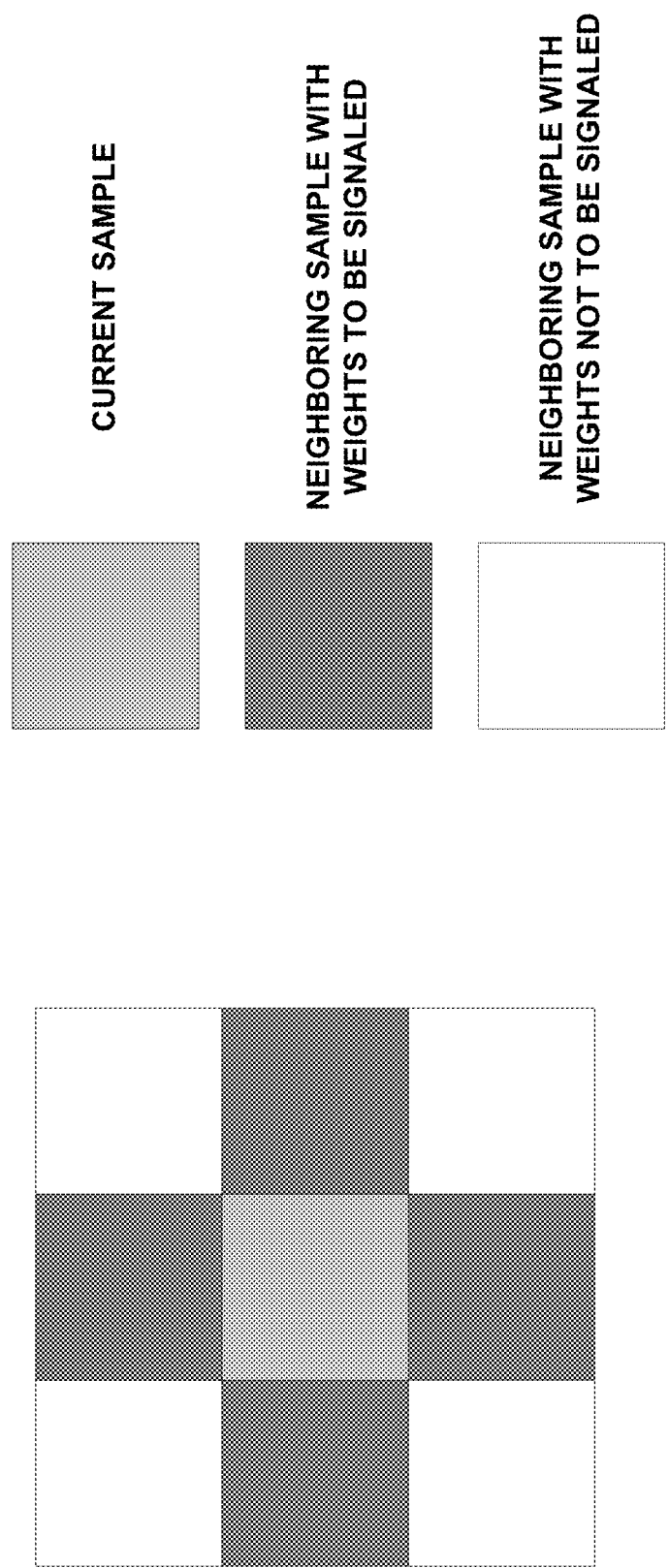
FIG. 8 is a conceptual diagram of one sample and its neighboring samples to be used in bilateral filtering.

FIG. 8 is a conceptual diagram of one sample and its neighboring samples to be used in bilateral filtering. When bilateral filter is applied to prediction block as mentioned above, the parameters for bilateral filtering may be signaled. That is, video encoder 200 may signal (e.g., encode and output) the bilateral filtering parameters, and video decoder 300 may receive, decode, and interpret the bilateral filtering parameters. A flag may be further signaled per CU/LCU to indicate whether the filtering applied to prediction block(s) is enabled or not. For each temporary prediction block or each grouped temporary prediction block, to which a bilateral filter is applied, a flag may be signaled. The signaling method for parameters (e.g., weights) may be as described in, e.g., U.S. Provisional Application No. 62/528,912, filed Jul. 5, 2017, and U.S. Provisional Application No. 62/556, 614, filed Sep. 11, 2017. Alternatively, not all of the weights associated with neighbor samples may be required to be signaled. Instead, for center positions, the weight may be derived on-the-fly without being signaled. An example is depicted in FIG. 8. Alternatively, the parameters may be derived on-the-fly without being signaled. Alternatively, whether to signal the parameters (or partial of the parameters) may depend on the coded information, such as if it is AMVP mode, parameters may be signaled; if it is merge mode, parameters may be inherited from the neighboring block wherein the motion information is obtained from. Alternatively, even for the merge mode, one flag to indicate whether to inherit or signal parameters may be further signaled.

Video encoder 200 and video decoder 300 may be configured to apply the techniques of this disclosure to certain color components only (e.g., luma only), to certain block sizes only (e.g., blocks smaller than a given size), and/or to certain block shapes only (e.g., square or non-square blocks). The proposed methods may be disallowed without being signaled for certain coded modes (such as DC/Planar intra prediction modes, skip mode, quantization parameters). The proposed methods may be disallowed without being signaled for certain blocks with no non-zero coefficients, quite a few number of non-zero coefficients, or all of the absolute values of transform coefficients being less than a threshold.

When bilateral filter or other kinds of filter is applied multiple times to the prediction block(s), instead of using average, video encoder 200 and video decoder 300 may use different linear combination of multiple filtered temporary prediction blocks to generate the final prediction block. In one example, for bi-prediction, instead of using average of two filtered temporary prediction blocks to generate the final prediction block, video encoder 200 and video decoder 300 may use (M*P0+N*P1)/(M+N), where Pi denotes the filtered temporary prediction block from reference picture list i (i being 0 or 1), M and N denote the linear weight for each of the filtered temporary prediction block.

When filters (such as bilateral filter) could be applied to prediction block(s), the following may apply. In one example, one or multiple default sets of filter parameters may be pre-defined or signaled in SPS/PPS/VPS/slice header. Alternatively, the difference between the default set of filter parameters and the real filter may be further signaled at block-level (such as CU/LCU/region with size smaller than a slice/tile/wavefront).

There may be some constraints of how to apply the filtering on the prediction blocks. For example, blocks larger or smaller than a threshold cannot apply this filter. In another example, blocks with a specific prediction type, such as Illumination Compensation (IC), affine, or Alternative Temporal Motion Vector Prediction (ATMVP) cannot apply the filter.

Figure 10:
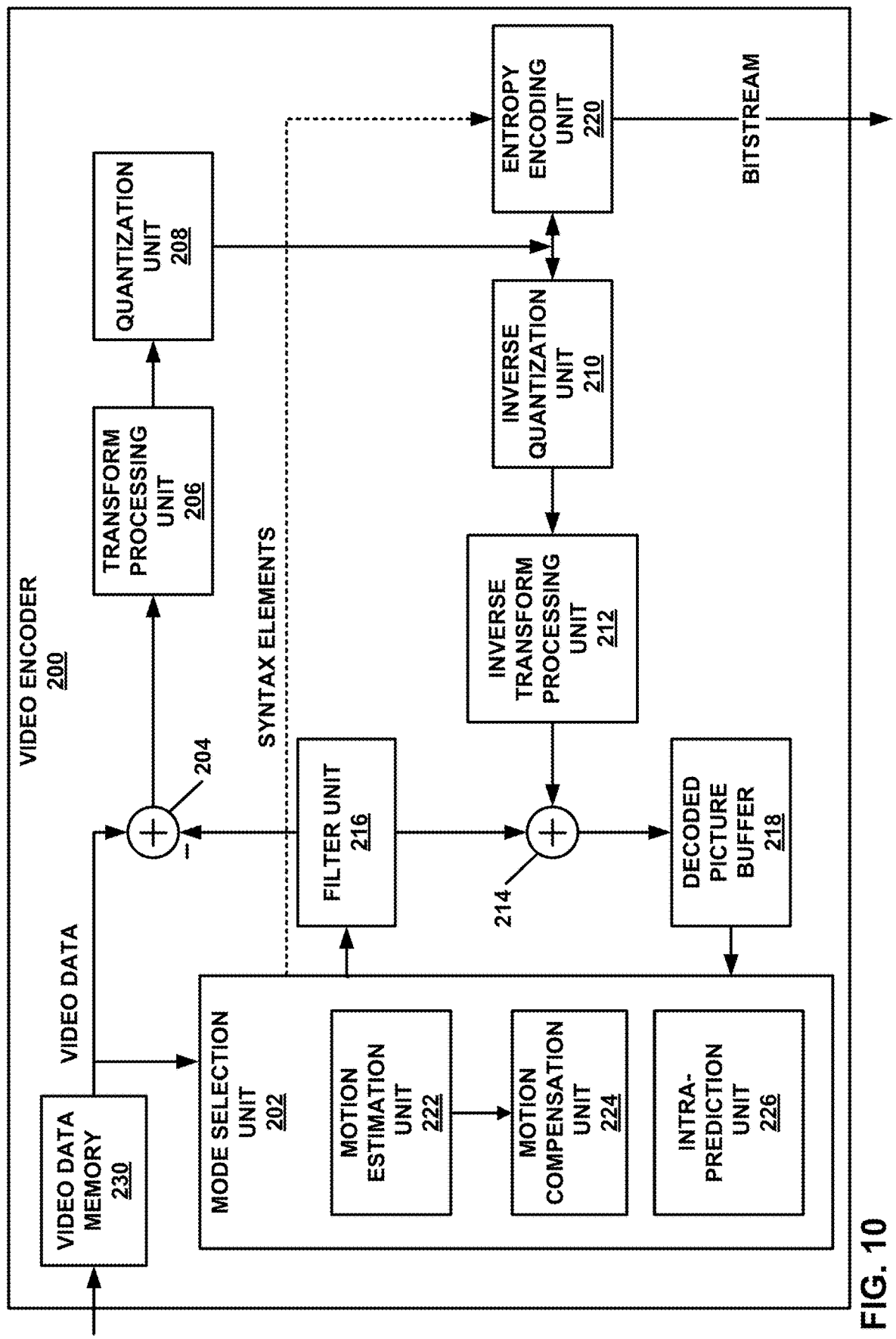
FIG. 10 is a block diagram illustrating an example video encoder that may perform the techniques of this disclosure.

FIG. 10 is a block diagram illustrating an example video encoder 200 that may perform the techniques of this disclosure. FIG. 10 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 10, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 10 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 210 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to filter unit 216. In accordance with the techniques of this disclosure, filter unit 216 applies a bilateral filter to the prediction block to generate a filtered prediction block. As discussed above, filter unit 216 may determine weighting values to apply to neighboring pixels (i.e., samples) to a current pixel of the prediction block to be filtered according to the values of the neighboring pixels. The weighting may be higher for pixels with similar luminance or chrominance values to the value of the current pixel. Likewise, the weighting may be higher for pixels that are closer to the current pixel than pixels that are further from the current pixel.

Filter unit 216 provides the filtered prediction unit to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block. Thus, Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the filtered prediction block generated by mode selection unit 202 and filter unit 216 to produce the reconstructed block. Additional filtering may be performed, such as an in-loop deblocking filter to address blockiness artifacts, although this filter is not shown in FIG. 10.

Video encoder 200 stores reconstructed (and potentially filtered) blocks in DPB 218. Motion estimation unit 222 and motion compensation unit 224 may retrieve a reference picture from DPB 218, formed from the reconstructed blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

In this manner, video encoder 200 represents an example of a device for coding (namely, encoding) video data including a memory configured to store video data; and one or more processors comprising circuitry and configured to generate a prediction block for a current block of video data; apply a bilateral filter to the prediction block to generate a filtered prediction block for the current block, wherein to apply the bilateral filter, the processor is configured to determine weighting values to apply to neighboring pixels to a current pixel of the prediction block to be filtered according to values of the neighboring pixels; and code the current block using the filtered prediction block.

Figure 11:
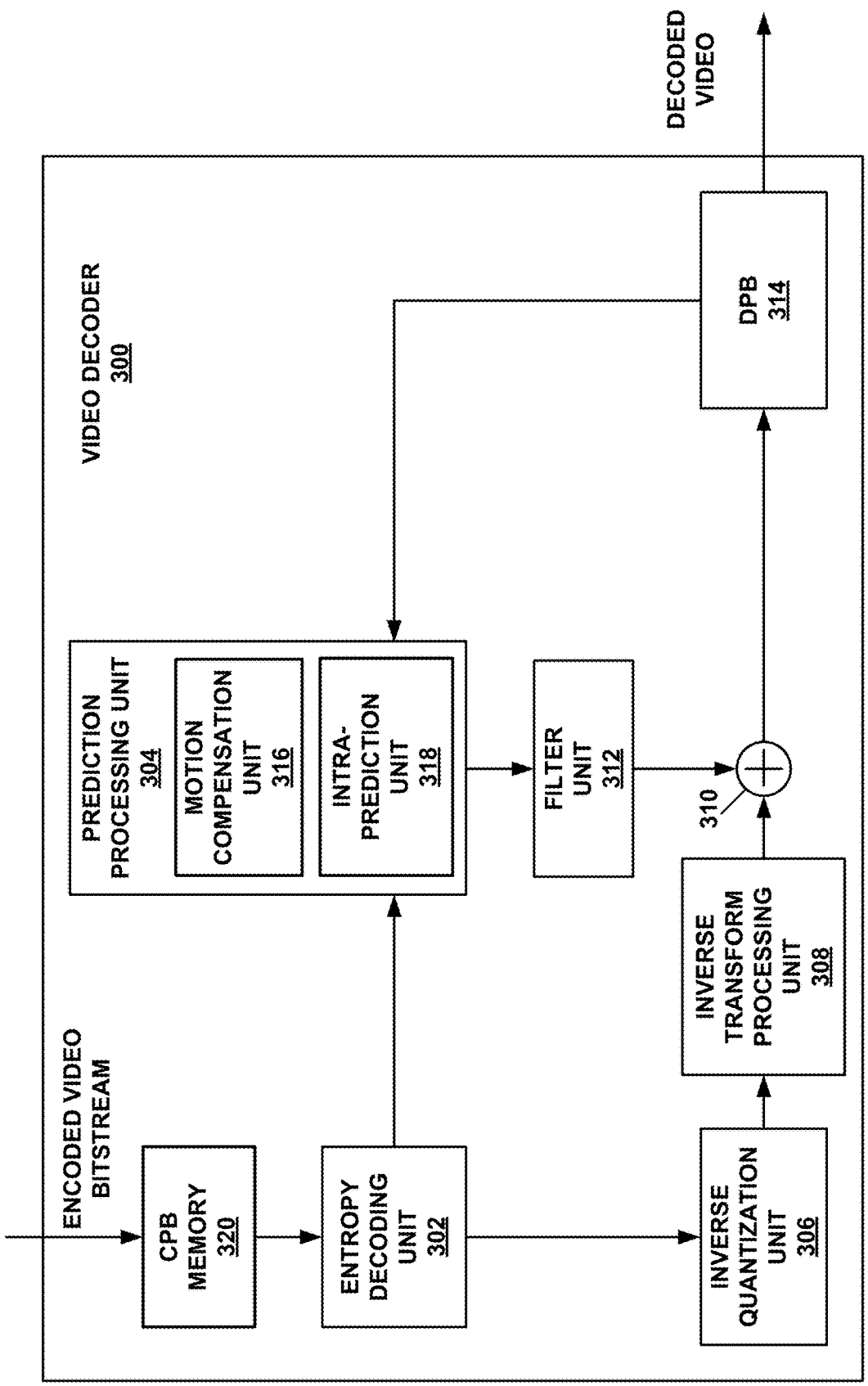
FIG. 11 is a block diagram illustrating an example video decoder that may perform the techniques of this disclosure.

FIG. 11 is a block diagram illustrating an example video decoder 300 that may perform the techniques of this disclosure. FIG. 11 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 11, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 318), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 11 are illustrated to assist with understanding the operations performed by video decoder 300. The units may be implemented as fixed-function circuits, programmable circuits, or a combination thereof. Similar to FIG. 10, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 10).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 10). Intra-prediction unit 318 may retrieve data of neighboring samples to the current block from DPB 314.

Prediction processing unit 304 provides a prediction block to filter unit 312 to generate a filtered prediction block. In accordance with the techniques of this disclosure, filter unit 312 applies a bilateral filter to the prediction block to generate a filtered prediction block. As discussed above, filter unit 312 may determine weighting values to apply to neighboring pixels (i.e., samples) to a current pixel of the prediction block to be filtered according to the values of the neighboring pixels. The weighting may be higher for pixels with similar luminance or chrominance values to the value of the current pixel. Likewise, the weighting may be higher for pixels that are closer to the current pixel than pixels that are further from the current pixel.

Filter unit 312 provides the filtered prediction block to reconstruction unit 310. Reconstruction unit 310 may reconstruct the current block using the filtered prediction block and the residual block. For example, reconstruction unit 310 may add samples of the residual block to corresponding samples of the filtered prediction block to reconstruct the current block. Although not shown in FIG. 11, video decoder 300 may further include an in-loop filter for filtering the reconstructed blocks, e.g., to remove blockiness artifacts. The in-loop filter may filter the output of reconstruction unit 310 and store the resulting filtered blocks to DPB 314.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a device for coding (namely, decoding) video data including a memory configured to store video data; and one or more processors comprising circuitry and configured to generate a prediction block for a current block of video data; apply a bilateral filter to the prediction block to generate a filtered prediction block for the current block, wherein to apply the bilateral filter, the processor is configured to determine weighting values to apply to neighboring pixels to a current pixel of the prediction block to be filtered according to values of the neighboring pixels; and code the current block using the filtered prediction block.

Figure 12:
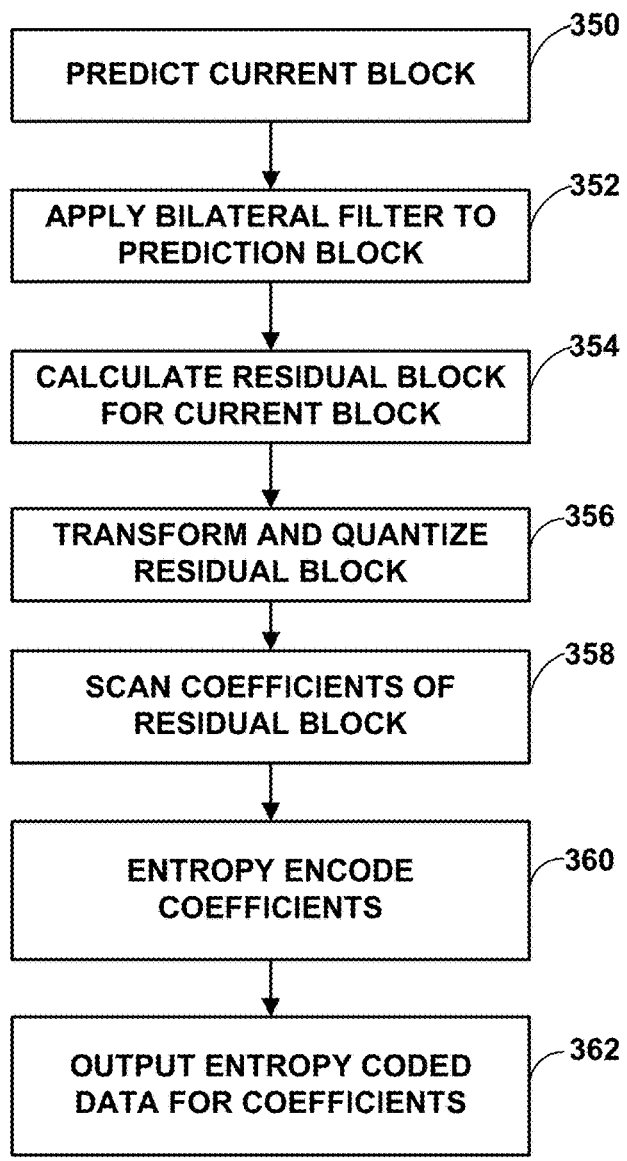
FIG. 12 is a flowchart illustrating an example method for encoding a current block according to the techniques of this disclosure.

FIG. 12 is a flowchart illustrating an example method for encoding a current block according to the techniques of this disclosure. The current block may comprise a current CU. Although described with respect to video encoder 200 (FIGS. 1 and 10), it should be understood that other devices may be configured to perform a method similar to that of FIG. 12.

In this example, video encoder 200 initially predicts the current block (350). For example, video encoder 200 may form a prediction block for the current block. Filter unit 216 of video encoder 200 may apply bilateral filtering to the prediction block (352) according to any or all of the techniques of this disclosure, as discussed above.

Video encoder 200 may then calculate a residual block for the current block (354). To calculate the residual block, video encoder 200 may calculate a difference between the original, uncoded block and the prediction block for the current block. Video encoder 200 may then transform and quantize coefficients of the residual block (356). Next, video encoder 200 may scan the quantized transform coefficients of the residual block (358). During the scan, or following the scan, video encoder 200 may entropy encode the coefficients (360). For example, video encoder 200 may encode the coefficients using CAVLC or CABAC. Video encoder 200 may then output the entropy coded data of the block (362).

In this manner, the method of FIG. 12 represents an example of a method of coding (namely, encoding) video data including generating a prediction block for a current block of video data; applying a bilateral filter to the prediction block to generate a filtered prediction block for the current block, wherein applying the bilateral filter comprises determining weighting values to apply to neighboring pixels to a current pixel of the prediction block to be filtered according to values of the neighboring pixels; and coding the current block using the filtered prediction block.

Figure 13:
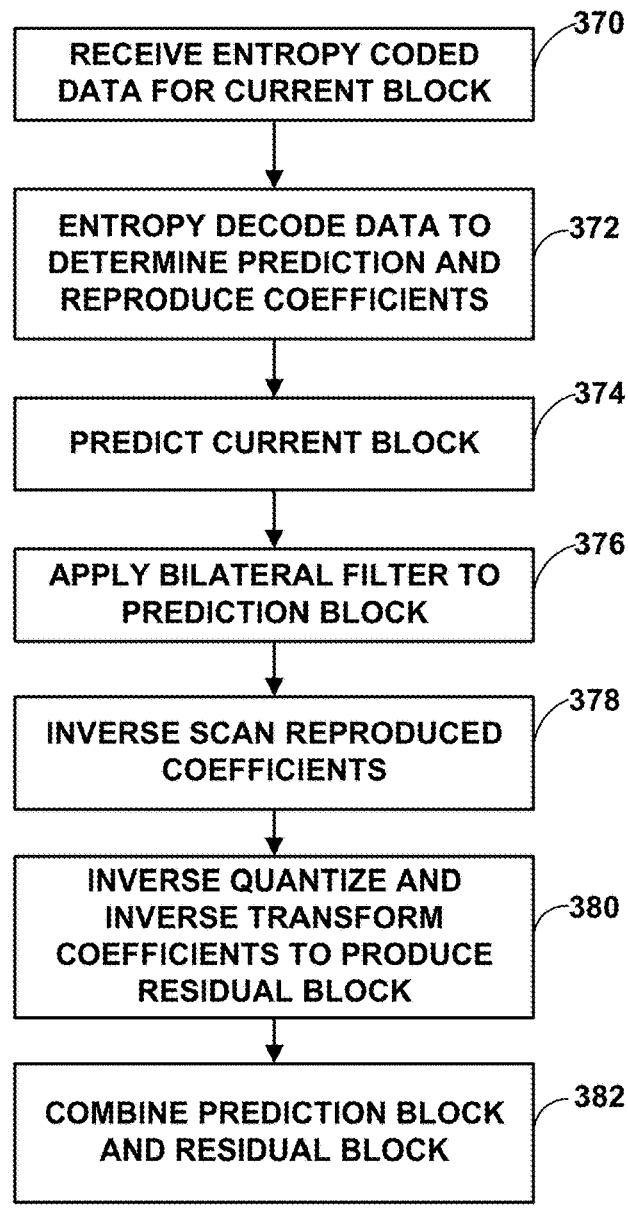
FIG. 13 is a flowchart illustrating an example method for decoding a current block of video data according to the techniques of this disclosure.

FIG. 13 is a flowchart illustrating an example method for decoding a current block of video data according to the techniques of this disclosure. The current block may comprise a current CU. Although described with respect to video decoder 300 (FIGS. 1 and 11), it should be understood that other devices may be configured to perform a method similar to that of FIG. 13.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Filter unit 312 of video decoder 300 may then apply a bilateral filter to the prediction block (376) according to any or all of the techniques of this disclosure, as discussed above. Video decoder 300 may then inverse scan the reproduced coefficients (378), to create a block of quantized transform coefficients. Video decoder 300 may then inverse quantize and inverse transform the coefficients to produce a residual block (380). Video decoder 300 may ultimately decode the current block by combining the prediction block and the residual block (382).

In this manner, the method of FIG. 13 represents an example of a method of coding (namely, decoding) video data including generating a prediction block for a current block of video data; applying a bilateral filter to the prediction block to generate a filtered prediction block for the current block, wherein applying the bilateral filter comprises determining weighting values to apply to neighboring pixels to a current pixel of the prediction block to be filtered according to values of the neighboring pixels; and coding the current block using the filtered prediction block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
    generating a prediction block for a current block of video data;
    applying a bilateral filter to the prediction block to generate a filtered prediction block for the current block, wherein applying the bilateral filter comprises determining weighting values to apply to neighboring pixels to a current pixel of the prediction block to be filtered according to values of the neighboring pixels; and
    coding the current block using the filtered prediction block.

2. The method of claim 1, wherein coding the current block comprises:
    subtracting the filtered prediction block from the current block to form a residual block for the current block;
    applying a transform to the residual block to generate a block of transform coefficients;
    quantizing the transform coefficients to form quantized transform coefficients; and
    entropy encoding the quantized transform coefficients.

3. The method of claim 1, wherein coding the current block comprises:
    entropy decoding quantized transform coefficients for the current block;
    inverse quantizing the quantized transform coefficients to generate transform coefficients for the current block;
    inverse transforming the transform coefficients to reproduce a residual block for the current block; and
    combining the residual block with the filtered prediction block to decode the current block.

4. The method of claim 1, wherein generating the prediction block comprises:
    generating a first temporary prediction block according to a first set of motion information for the current block;
    generating a second temporary prediction block according to a second set of motion information for the current block; and
    combining the first temporary prediction block with the second temporary prediction block to generate the prediction block.

5. The method of claim 4, further comprising generating the first set of motion information and the second set of motion information according to bi-prediction.

6. The method of claim 4, further comprising generating the first set of motion information and the second set of motion information according to multi-hypothesis prediction.

7. The method of claim 1, wherein generating the prediction block and applying the bilateral filter to the prediction block comprises:
    generating a first temporary prediction block according to a first set of motion information for the current block;
    bilateral filtering the first temporary prediction block to generate a first temporary filtered prediction block;
    generating a second temporary prediction block according to a second set of motion information for the current block;
    bilateral filtering the second temporary prediction block to generate a second temporary filtered prediction block; and
    combining the first temporary filtered prediction block with the second temporary filtered prediction block to generate the prediction block.

8. The method of claim 7, further comprising generating the first set of motion information and the second set of motion information according to bi-prediction.

9. The method of claim 7, further comprising generating the first set of motion information and the second set of motion information according to multi-hypothesis prediction.

10. The method of claim 7, wherein combining the first temporary filtered prediction block with the second temporary filtered prediction block comprises averaging the first temporary filtered prediction block with the second temporary filtered prediction block.

11. The method of claim 7, wherein combining the first temporary filtered prediction block with the second temporary filtered prediction block comprises applying a first weight to the first temporary filtered prediction block and applying a second weight to the second temporary filtered prediction block.

12. The method of claim 7, wherein combining the first temporary filtered prediction block with the second temporary filtered prediction block comprises generating the prediction block according to $(M*P0+N*P1)/(M+N)$, wherein i in Pi denotes the filtered temporary prediction block from reference picture list i (i being 0 or 1), M denotes a linear weight for the first temporary filtered prediction block, and N denotes a linear weight for the second temporary filtered prediction block.

13. The method of claim 1, wherein generating the prediction block comprises generating the prediction block according to at least one of inter-prediction, intra-prediction, intra-block copy, cross-component linear model prediction, inter-layer prediction in scalable video coding, or inter-view prediction in 3D-video coding.

14. The method of claim 1, further comprising coding a flag for the current block indicating whether bilateral filtering is enabled.

15. The method of claim 1, further comprising coding one or more flags for one or more prediction blocks of the current block indicating whether bilateral filtering is enabled for the corresponding prediction blocks.

16. The method of claim 1, further comprising coding bilateral filter parameters for the current block.

17. The method of claim 1, further comprising deriving one or more bilateral filter parameters without coding the derived bilateral filter parameters.

18. The method of claim 1, further comprising determining whether bilateral filter parameters are to be derived or coded according to information indicating whether motion information for the current block is coded according to advanced motion vector prediction (AMVP) mode or merge mode.

19. The method of claim 1, wherein the current block comprises a luminance (luma) block, the method further comprising avoiding bilateral filtering of prediction blocks for one or more chrominance (chroma) blocks corresponding to the luma block.

20. The method of claim 1, wherein the current block comprises a block having a size less than a threshold, the method further comprising avoiding bilateral filtering of prediction blocks for blocks having sizes greater than or equal to the threshold.

21. The method of claim 1, wherein the current block comprises a block having a predetermined shape, the method further comprising avoiding bilateral filtering of prediction blocks for blocks having shapes other than the predetermined shape.

22. The method of claim 1, wherein applying the bilateral filter to the prediction block comprises applying the bilateral filter to the prediction block after determining that the current block is not predicted according to one or more predetermined prediction modes.

23. The method of claim 1, wherein applying the bilateral filter to the prediction block comprises applying the bilateral filter to the prediction block after determining that a quantization parameter for the current block is below a threshold.

24. The method of claim 1, wherein applying the bilateral filter to the prediction block comprises applying the bilateral filter to the prediction block after determining that a quantization parameter for the current block is above a threshold.

25. The method of claim 1, wherein applying the bilateral filter to the prediction block comprises applying the bilateral filter to the prediction block after determining that a number of non-zero coefficients of the current block is less than or equal to a threshold.

26. The method of claim 1, wherein applying the bilateral filter to the prediction block comprises applying the bilateral filter to the prediction block after determining that all absolute values for each non-zero transform coefficient of the current block are less than or equal to a threshold.

27. The method of claim 1, further comprising coding data representing one or more default sets of bilateral filter parameters in at least one of a sequence parameter set, a picture parameter set, a video parameter set, or a slice header.

28. A device for coding video data, the device comprising:
a memory configured to store video data; and
one or more processors comprising circuitry and configured to:
generate a prediction block for a current block of video data;
apply a bilateral filter to the prediction block to generate a filtered prediction block for the current block, wherein to apply the bilateral filter, the processor is configured to determine weighting values to apply to neighboring pixels to a current pixel of the prediction block to be filtered according to values of the neighboring pixels; and
code the current block using the filtered prediction block.

29. A device for coding video data, the device comprising:
means for generating a prediction block for a current block of video data;
means for applying a bilateral filter to the prediction block to generate a filtered prediction block for the current block, wherein the means for applying the bilateral filter comprises means for determining weighting values to apply to neighboring pixels to a current pixel of the prediction block to be filtered according to values of the neighboring pixels; and
means for coding the current block using the filtered prediction block.

30. A non-transitory computer-readable storage medium having stored thereon instructions that, when executed, cause one or more processors to:
generate a prediction block for a current block of video data;
apply a bilateral filter to the prediction block to generate a filtered prediction block for the current block, wherein the instructions that cause the processor to apply the bilateral filter comprise instructions that cause the processor to determine weighting values to apply to neighboring pixels to a current pixel of the prediction block to be filtered according to values of the neighboring pixels; and
code the current block using the filtered prediction block.

* * * * *